US012584347B2

(12) United States Patent
Smith

(10) Patent No.: US 12,584,347 B2
(45) Date of Patent: Mar. 24, 2026

(54) INSTALLATION METHOD

(71) Applicant: Earl M. Smith, St. Paul, MN (US)

(72) Inventor: Earl M. Smith, St. Paul, MN (US)

( * ) Notice: Subject to any disclaimer, the term of this patent is extended or adjusted under 35 U.S.C. 154(b) by 110 days.

(21) Appl. No.: 17/899,211

(22) Filed: Aug. 30, 2022

(65) Prior Publication Data

US 2024/0068293 A1 Feb. 29, 2024

(51) Int. Cl.

*E06B 1/62* (2006.01)
*E04B 1/66* (2006.01)
*E06B 1/66* (2006.01)
*E06B 1/68* (2006.01)

(52) U.S. Cl.

CPC ................ *E06B 1/62* (2013.01); *E04B 1/665* (2013.01); *E06B 2001/628* (2013.01); *E06B 1/66* (2013.01); *E06B 1/68* (2013.01)

(58) Field of Classification Search

None

See application file for complete search history.

(56) References Cited

U.S. PATENT DOCUMENTS 4,221,091 A 9/1980 Ganse et al.
4,486,990 A 12/1984 Bauch
4,827,685 A 5/1989 Schmidt
8,011,145 B1 * 9/2011 Collins ................. E04B 1/4178 52/513
8,074,409 B2 12/2011 Goldberg et al.
8,109,052 B2 * 2/2012 Rosende ............... E06B 1/6015 52/204.55
8,833,035 B2 * 9/2014 Vos ........................... E06B 1/62 49/408
9,140,051 B1 * 9/2015 Kierecki ................... E06B 7/14
9,150,764 B2 10/2015 Braun et al.
9,512,656 B2 12/2016 Lee
9,963,875 B1 * 5/2018 Prygon ................... E04C 2/528
11,719,037 B2 * 8/2023 Farnes ....................... E06B 7/10 454/196
2001/0034984 A1 * 11/2001 Murphy .................... E06B 1/62 52/204.5
2008/0110110 A1 * 5/2008 Burton .................. E06B 1/6084 52/741.1
2009/0025319 A1 * 1/2009 Westfall .................... E06B 1/62 52/204.5
2010/0077669 A1 * 4/2010 Daniel ...................... E06B 1/62 49/475.1
2010/0170186 A1 * 7/2010 Hohmann, Jr. ....... B32B 27/065 52/746.1

(Continued)

OTHER PUBLICATIONS www.youtube.com/watch?v=ytttti-hnzc (Year: 2014).*

*Primary Examiner* — Phi D A

(74) *Attorney, Agent, or Firm* — Bradley J. Thorson; DeWitt LLP

(57) ABSTRACT

Needless repairs can be avoided, and energy savings can be achieved, through installation of windows using methods that incorporate the use of extruded water-resistant foam, bonding tape covering the flanges and fasteners or windows and building wrap covering the bonding tape. This system becomes part of the window, system to improve strength, air and moisture penetration Also eliminating the building wrap bonding tape at the head prevents trapping moisture behind build bonding tape. This system eliminates all voids around the window and frame and becomes part of the structure of the window, etc.

9 Claims, 4 Drawing Sheets

(56) References Cited

U.S. PATENT DOCUMENTS

| | | | | |
|---|---|---|---|---|
| 2010/0229489 | A1* | 9/2010 | Riepe | E04B 1/4178<br>52/745.12 |
| 2010/0251643 | A1* | 10/2010 | Rosende | E06B 1/62<br>52/204.2 |
| 2011/0258944 | A1* | 10/2011 | Radoane | E04B 1/665<br>52/220.8 |
| 2012/0085063 | A1* | 4/2012 | Pufahl | E06B 1/62<br>428/141 |
| 2013/0097963 | A1* | 4/2013 | Deiss | E04B 1/68<br>52/741.4 |
| 2016/0060863 | A1* | 3/2016 | Deiss | E04B 1/6812<br>428/58 |
| 2016/0305120 | A1* | 10/2016 | Radoane | H02G 3/36 |
| 2017/0138113 | A1* | 5/2017 | Norwood | E06B 1/36 |
| 2018/0112394 | A1* | 4/2018 | Giles | E04B 1/7629 |
| 2020/0240138 | A1* | 7/2020 | Ouimette | E04B 1/665 |

* cited by examiner

INSTALLATION METHOD

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to building construction. More specifically, the present invention relates to improved methods of installing windows, doors and any other device installed in an opening in a wall of a building. The installation methods of the present invention prevent infiltration of moisture and air that can lead to condensation. Such moisture and condensation are known to cause rotting of members used in construction of the building and can lead to the growth of mold and mildew. The methods of the present invention also improve R values related to the installation, i.e., a measure of how well a two-dimensional barrier, such as the wall in which the window is installed resists the conductive flow of heat and cold.

II. Related Art

Windows and doors have been installed in the walls of buildings for centuries. The advantages of windows and doors are well-known. Window let light into buildings and transparent windows allow people in the building to see to the outside. Doors allow for ingress and egress. More recently, other devices have been installed in openings through a wall of a building. Such devices include electrical boxes, pipes and plumbing fixtures, vents, and the like Various methods have been employed to install windows, doors, and such other devices. Yet, even today, infiltration of water though gaps around windows, doors and such other devices leads to damage over time. Further, gaps left between the framing adjacent to such window, doors, and other devices allows conductive flow of heat and cold around windows, doors, and such other devices. Under even the best of circumstances, such conductive flow of air results in increased costs to heat or cool a building. Condensation often also results leading to damages and costly repair over time.

SUMMARY OF THE INVENTION

The present invention solves the foregoing problems by providing methods of installation that eliminate water infiltration and condensation and increase the R value achieved. More specifically, the present invention relates to methods of installing doors, and other devices in a building. While the methods are described herein with reference to a window, the methods may also be applied to doors and other devices installed in openings in a wall.

These methods contemplate providing a wall with a rough opening of a first predetermined shape, e.g., a rectangle, a square, a triangle, a trapezoid, an octagon, any other polygon or a circle or oval. The rough opening also has a first predetermined size. The first size and first shape of the rough opening are defined by a rough opening frame.

FIG. 1 shows a rough opening frame 12 defining a rectangular rough opening 10 of a construction well-known in the prior art. Rough opening frame 12 includes a pair of vertical king studs 17/18. Extending between the king studs are a sill plate 15 and two-piece header comprising members 16*a* and 16*b*. Two jack studs 13 and 14 are positioned to the inside of and abut the king studs 17 and 18. The jack studs 13 and 14 also extending between the header and the sill plate 15 and help hold the header in place. The sill plate is also supported by a plurality of cripple studs 19/20/21/22/23. Also shown at a bottom plate 24. A top plate 25 and a piece of sheathing 24 coupled to the frame 12. Other rough opening framing arrangements are well known in the art and are used when the rough opening 10 needs to be of a different size or shape. One skilled in the art will appreciate that size and shape of the rough opening will depend on the size and shape of the window (or door or other device) to be installed in the rough opening.

The methods of the present invention also contemplate providing a window having a perimeter of a shape matching the shape of the rough opening and sized to fit in the rough opening. The size and shape of the window perimeter are defined be a window frame. More specifically, the size and shape of the window frame should correspond to the size and shape of the rough opening so that the window substantially fills the rough opening. The frame of the window may be constructed of any suitable material including, without limitation, woods clad with vinyl, aluminum, or steel.

FIG. 2 shows a fixed window 30 of a type well-known in the prior art. Other types of windows, including without limitation double hung windows and casement windows, may be used without deviating from the invention. As shown in FIG. 2, the window 30 includes a frame 32 surrounding the glass panel(s) of the window. The frame includes a top frame member 34 and a bottom frame member 36. Extending between the top and bottom frame members are a pair of side frame members 38 and 40. Flanges 35, 37, 39 and 41 extend from each of these frame members. The flanges may be formed as a single piece with the associated frame member or may be separate pieces installed either at the factory where the windows are made or in the field. Other window framing arrangements are used when the window is to be of a different shape. Also, while not shown in FIG. 1, one skilled in the art will appreciate that the exterior of the framing members is typically covered with sheathing 24 while the rough opening is not so covered.

When the present invention is employed, the rough opening 10 should be adapted such that with window frame 32 fits into the rough opening 10 leaving a gap in the range of ½ inch to ¾ inch surrounding the window frame between the window frame and the rough opening frame. Also, the rough opening should be adapted so the flanges 35, 37, 39 and 41 extend over a portion of the jack studs 13/14, sill plate 15 and header 16*a*/*b*. As such, the window 30 is held in place in the rough opening 10, with the requisite gap about the entire perimeter of the window, by securing top flange 35 to the header 16, the bottom flange 37 to the sill plate 15, and the side flanges 39 and 41 to the jack studs 13/14 or king studs 17/18 to the rough opening frame. Maintaining this gap during installation is preferably achieved using extruded polystyrene (XPS) shims although other shims may be sued without deviating from the invention. The flanges 35, 37, 39 and 41 extend roughly one inch over the header 16*a*/*b*, the sill plate 15, and the side flanges 39 and 41 to the jack studs 13/14 or king studs 17/18 and are secured to the header 16*a/b*, the sill plate 15, and the jack studs 13/14 or king studs 17/18 using a plurality of rust-proof fasteners (e.g., flat head screws or nails) 70 while maintaining the requisite gap in the range of ½ inch to ¾ inch between the window frame and the rough opening frame. As is discussed later, the methods of the present invention involve subsequently filling this gap with a foam 76 that further stabilizes the window in the rough opening and prevents infiltration of air and moisture into or through this gap. Page 5 line 9 add a, b to header 16, last line sheathing or structure. While not shown in FIG. 2, the flanges are often provided with spaced slots though which such screws or nails may pass through the underlying sheathing and into the underlying framing member.

The process of the present invention further entails installing a rubber bonding tape 72 so that it extends over each of the plurality of flanges, each of the plurality of rust proof fasteners and a portion of the sheathing 24 of the wall at least one inch wide surrounding the flanges. Various types of bonding tape 72 may be employed. Such bonding tapes typically include a first layer of a suitable material and an adhesive layer. The first layer may be silicone rubber or ethylene propylene diene monomer (EPDM) rubber, for example. The bonding tape must be suitable for exterior application and have the capability of being installed over a suitable range of temperatures and capable of continuing to adhere over the full range of temperatures to which the bonding tape will be exposed throughout the life of the instillation. Thus, the specific type of bonding tape employed will depend climatic conditions and temperature variations reasonably anticipated at the location of the installation.

Further, the bonding tape 72 selected should also have excellent resistance to moisture and ultraviolent (UV) light, and non-reactive to solvents and other chemicals. A pressure sensitive adhesive will make installation of the bonding tape simpler and quicker than other types of adhesives. A suitable bonding tape properly applied will further couple the window to the surrounding structures of the building.

The process of the present invention further entails installing a building wrap 74 over the wall so that the building wrap extends over the window bonding tape 72 on all sides of the window. Building wraps in use today include asphalt-saturated felt or kraft paper, woven or nonwoven polymeric sheets, and liquid-applied polymer-asphalt membranes. Polymeric wraps are becoming more common. Woven polymeric wraps are made of crisscrossing plastic bonding tapes coated with a waterproof film and may be micro-perforated to allow vapor to pass. Polymeric wraps are suitable for use behind fiber cement siding, wood, and vinyl, the film can also include UV inhibitors if prolonged exposure during construction of the building is contemplated.

The process of the present invention also includes filling the gap between the window frame 32 and the rough opening frame 12 with a sprayed extruded water-resistant foam 76. As mentioned above, use of such a sprayed extruded water-resistant foam to fill the gap serves several purposes, including assisting in supporting the window 30 in the rough opening 10, preventing air and moisture migration in or out of the building, and reducing conductive flow of heat around the window. The sprayed extruded water-resistant foam 76 is preferably an extruded polystyrene ("XPS") foam. XPS foam has a closed cell structure. Thus, XPS foam is significantly less permeable with respect to both moisture and air than open celled foams. XPS foam also has a higher load strength, in the range of 40 pounds per square inch, than open celled foams making the foam a more significant contributor to firmly supporting the window in the rough opening.

In addition to the foregoing, installation of the window 30 in the rough opening 10 may include holding the building wrap in place over the flange and rubber bonding tape using one or more pieces of exterior trim or wrap fasteners. Such wrap fasteners typically comprise a flat head nail passing through a plastic washer and are used to couple the building wrap to the jack studs 13 and 14. The header, flange and sill flange should be adapted to allow moisture reaching the zone between the bonding tape and building wrap to drain. Often, the flanges themselves are suitably shaped. In other cases, a window manufacturer will supply separate drip edges which should be installed per the window manufacturer's instructions.

Once the foregoing steps are completed, the interior and exterior portions of the wall are completed in any well-known manner. For example, sheetrock and window trim may be applied to the interior of the wall and window flashing, trim and siding may be applied to the exterior of the wall.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts.

DETAILED DESCRIPTION

Figure 1:
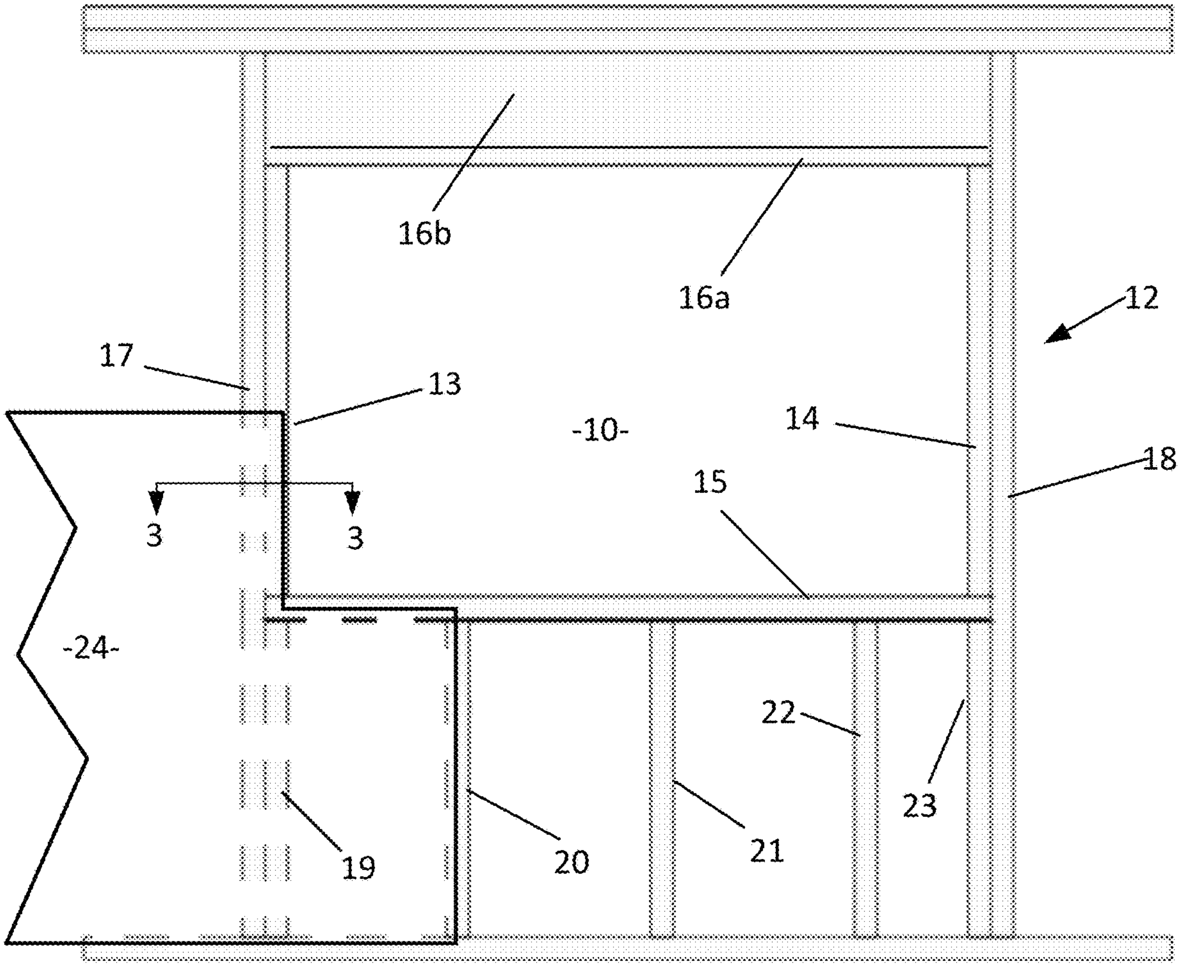
Fig. 1 (Prior Art)
FIG. 1 is a plan view framing of a rough opening made using a standard prior art technique.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

Figure 3:
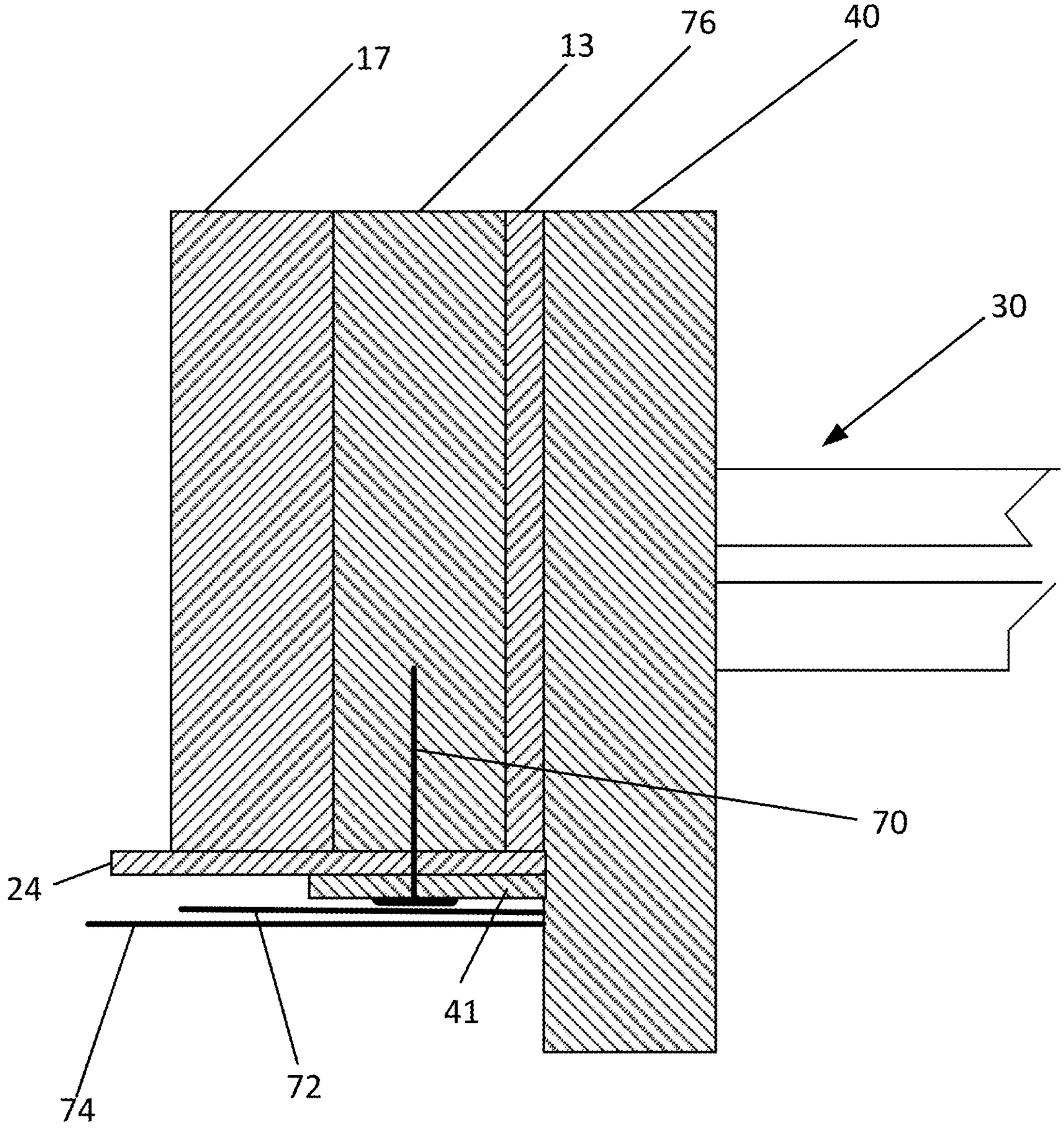
FIG. 3 is a cross-section view through line 3-3 in FIG. 1 after a window has been positioned in the rough opening.
Figure 4:
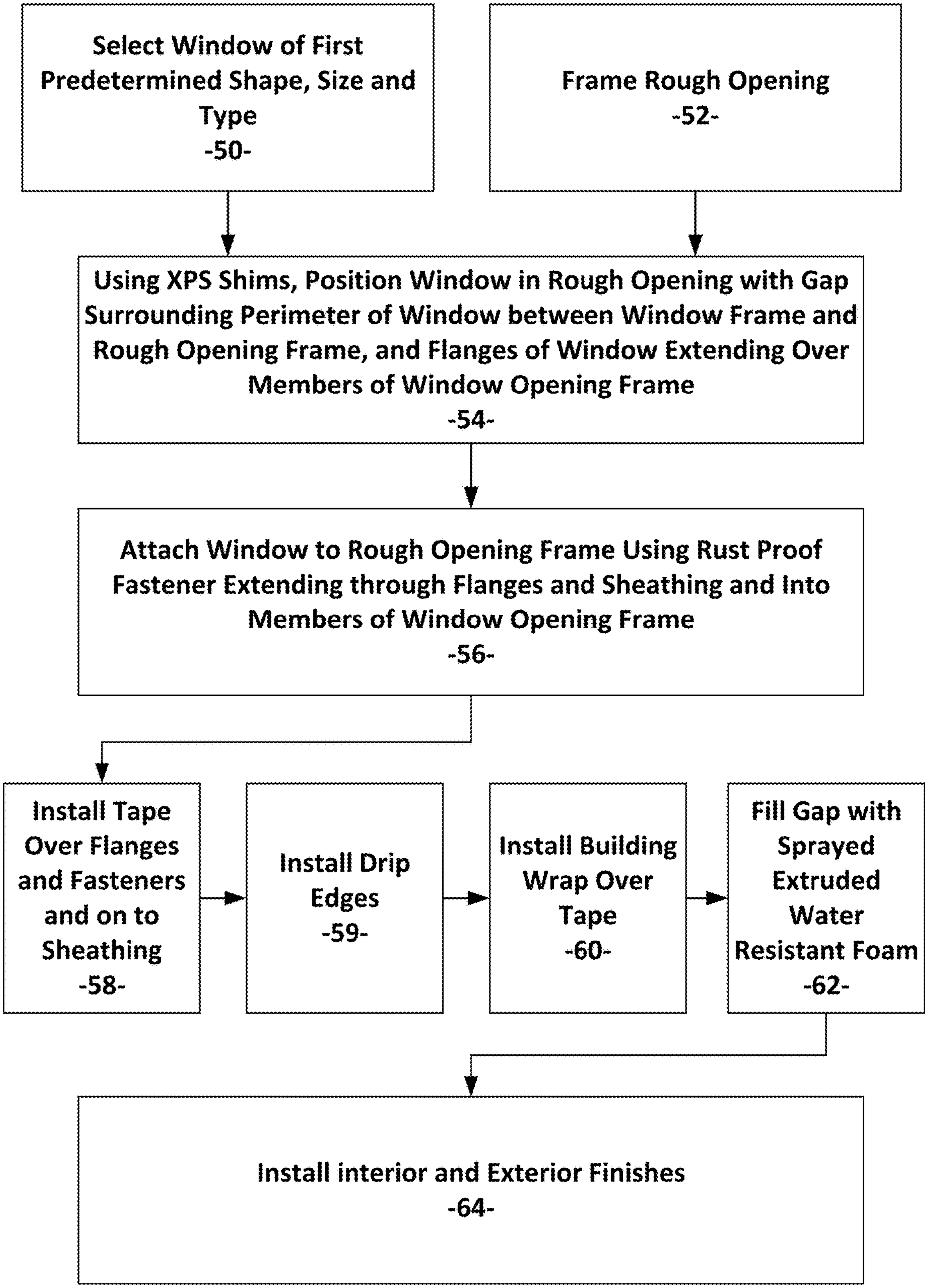
FIG. 4 is a flow chart of steps carried out in accordance with the present invention to install a window of a type made in accordance with FIG. 2 in a rough opening framed in accordance with FIG. 1.

As illustrated in FIGS. 3 and 4, the process of the present invention begins by selecting a window of a desired shape and size at step 50 and framing a rough opening at step 52 adapted to receive the selected window. Again, and as shown in FIG. 1, a rough opening frame 12 defines a rectangular rough opening 10. Rough opening frame 12 includes a pair of vertical king studs 17/18. Extending between the king studs are a sill plate 15 and header 16*a/b*. Two jack studs 13 and 14 are positioned to the inside of and abut the king studs 17 and 18. The jack studs 13 and 14 are also extending between the header 16 and the sill plate 15 and help hold the header 16*a/b* in place. The sill plate is also supported by a plurality of cripple studs 19/20/21/22/23. Other rough opening framing arrangements are used when the rough opening 10 is to be of a different shape. One skilled in the art will appreciate that the shape and size of the rough opening are dictated by the size, shape and type of the window employed.

Figure 2:
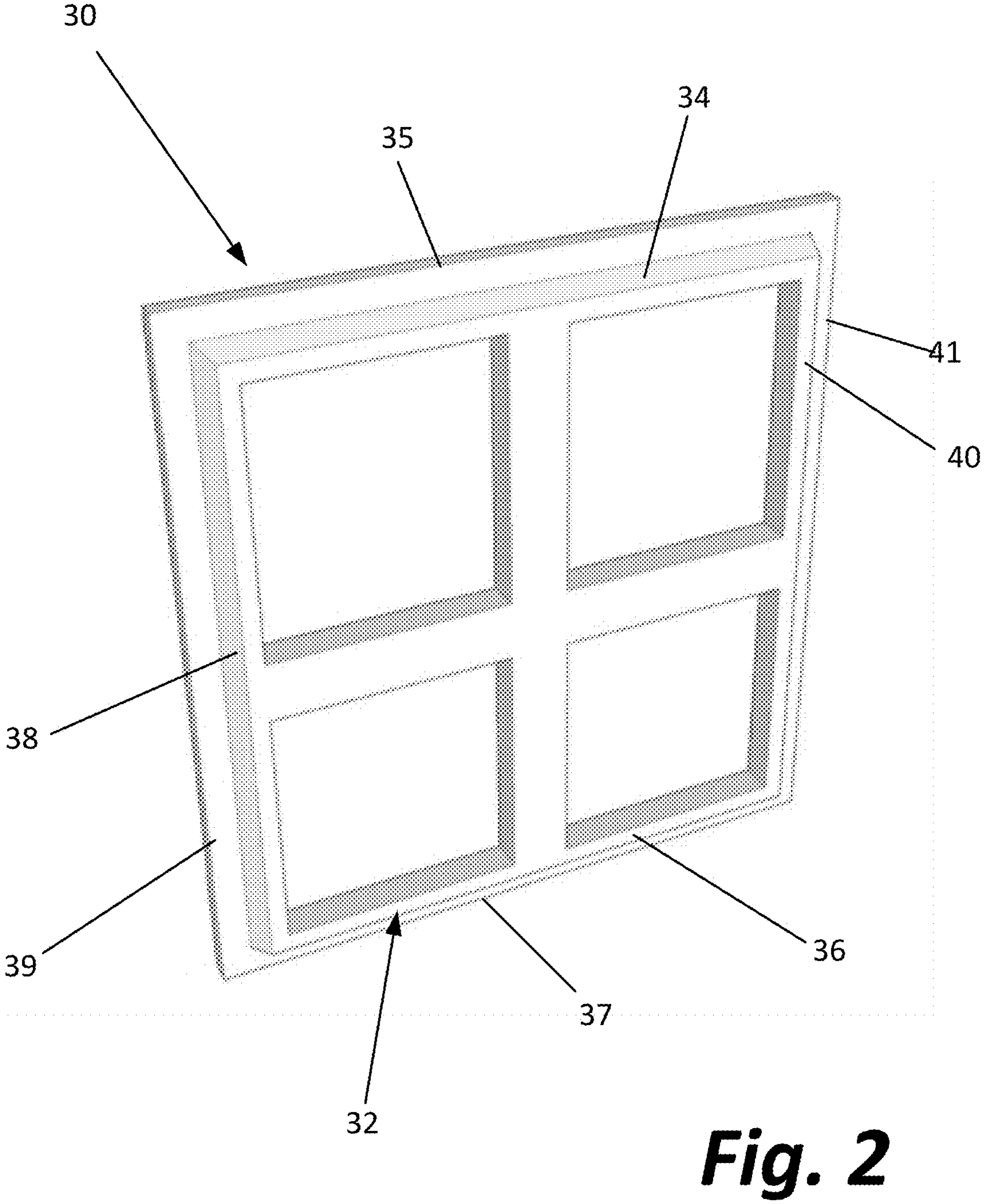
Fig. 2 (Prior Art)
FIG. 2 is a plan view of a prior art window having a window frame and flanges extending therefrom.

The window selected when performing the method of the present invention will have a perimeter of a first predetermined shape matching the predetermined shape of the rough opening and sized to fit in the rough opening. The size and shape of the window perimeter are defined to be a window frame. FIG. 2 shows an exemplary window 30 of a type suitable installed using the method of the present invention. As shown in FIG. 2, the window 30 includes a frame 32. The frame includes a top frame member 34 and a top flange 35 extending from the top frame member 34. The window frame 32 also includes a bottom frame member 36 and a bottom flange 37 extending from the bottom frame member 36. Extending between the top and bottom frame members are a pair of side frame members 38 and 40. A first side flange 39 extends from side frame member 38 and a second side flange 41 extends from side frame member 40. Other window framing arrangements are used when the window is to be of a different shape. Also, as shown in FIG. 1, the exterior of the framing members (i.e., jack studs 13/14) are typically covered with sheathing 24 while the rough opening is not so covered.

When the present invention is employed, the window frame 32 and/or the rough opening 10 should be adapted such that window frame 32 fits into the rough opening 10 leaving a gap in the range of ½ inch to ¾ inch surrounding the window frame on all sides between the window frame and the rough opening framing. Also, the flanges and rough opening should be adapted so the flanges extend over a portion of the jack studs 13/14, sill plate 15 and header 16*a*/16*b*.

As indicated at step 54 in the flow chart of FIG. 3, the window 30 is positioned in the rough opening with the requisite gap about the entire perimeter of the window between the window frame and the rough opening frame. Shims are used to maintain the gap during framing. Using XPS shims is preferred, but other shims may be used. Further, the flanges of the window extend over the members used to construct the rough opening frame 12.

At step 56, the window frame is secured in place to the rough opening frame while maintaining a gap in the range of ½ inch to ¾ inch surrounding the window frame between the window frame and the rough opening frame. The window is so secured to the rough opening frame by securing top flange 35 to the header 16*a*, the bottom flange 37 to the sill plate 15 or the cripple studs 19/20/21/22/23, and the side flanges 39 and 41 to the jack studs 13/14 or king studs 17/18. The flanges are so secured using a plurality of rust-proof fasteners (e.g., flat head screws or nails) 70 while maintaining the requisite gap in the range of ½ inch to ¾ inch between the window frame and the rough opening frame. The flanges may be provided with spaced slots (not shown) through which such screws or nails may pass through the underlying sheathing and into the underlying framing member. The flanges may be preinstalled at the window factory or installed at the job site depending on the window selected.

The process of the present invention further entails three key steps identified as steps 58, 60 and 62 in FIG. 4. As step 58, rubber pressure sensitive bonding tape 72 is installed so that it extends over (a) each of the plurality of flanges (e.g., flange 41 as shown in FIG. 3), including the corners where the flanges meet, (b) each of the plurality of rust proof fasteners 70, and (c) a portion of the sheathing 24 of the wall at least one inch wide surrounding the flanges. As explained above, various types of bonding tape 72 may be employed. Such bonding tapes typically include a first layer (i.e., a substrate) of a suitable material and an adhesive layer. The first layer or substrate may be silicone rubber or ethylene propylene diene monomer (EPDM) rubber, for example. The bonding tape must be suitable for exterior applications given the climatic conditions in the region of the installation and have the capability of being installed over a wide range of temperatures and have even a wider range of service temperatures. A wider range of service temperatures is particularly necessary when the installation is in a climate having temperature extremes ranging from well below 0° F. and peaking at over 100° F. Both the substrate and the adhesive layer selected should have excellent resistance to moisture and ultraviolent (UV) light and be non-reactive to solvents and other chemicals. A pressure sensitive adhesive will make installation of the bonding tape simpler and quicker than other types of adhesives.

Step 59 shown in FIG. 4 involves installing any separate drip edges supplied by the window manufacturer in accordance with the manufacturer's instructions.

At step 60, a building wrap (74 in FIG. 3) applied to the exterior of the wall is extended over the window bonding tape on the jam and sill sides 37, 39 and 41 of the window. As explained above, building wraps in use today include asphalt-saturated felt or kraft paper, woven or nonwoven polymeric sheets, and liquid-applied polymer-asphalt membranes. Any such wraps may be employed when practicing the present invention. Woven polymeric wraps work particularly well. Woven polymeric wraps are made of crisscrossing plastic bonding tapes coated with a waterproof film and may be micro-perforated to allow vapor to pass. Polymeric wraps are suitable for use behind fiber cement siding, wood, and vinyl, brick, brick veneer, and stucco. The film can also include UV inhibitors if prolonged exposure during construction of the building is contemplated.

At step 62, the gap between the window frame 32 and the rough opening frame 12 is filled with a sprayed extruded water-resistant foam 76. Use of such a sprayed extruded water-resistant foam (e.g., XPS foam) to fill this gap 100% serves several purposes. First, the foam is relatively stiff and firm after it sets up. As such, the foam assists with supporting the window 30 in the rough opening 10. Second, the foam prevents air and moisture migration in or out of the building. Third, the foam reduces conductive flow of heat around the window. The sprayed extruded water-resistant foam is preferably an extruded polystyrene foam. It can be used at the jams and sill bonding tape (same as the bonding tape used for the window to prevent tearing of the wrap before the outside studding is installed), at the head of the washer nail and nail or screw with the washer to prevent moisture from penetrating the substrate. This is a significant step that is not being done.

In addition to the foregoing, installation of the window 30 in the rough opening 10 may include having a building wrap 74 held in place over the rubber bonding tape 72 and flanges (e.g., 41) using one or more pieces of exterior trim or wrap fasteners. Such wrap fasteners typically comprise a flat head nail passing through a plastic washer.

Once the foregoing steps are completed, the interior and exterior portions of the wall are completed in any well-known manner at step 64. For example, sheetrock and window trim may be applied to the interior of the wall and window flashing, trim and siding may be applied to the exterior of the wall.

Within the scope of the following claims, the invention may be practiced otherwise than as specifically shown in the drawings and described above. The methods may be used in connection with all buildings, new or old, residential or commercial. Likewise, the framing and sheathing may be made of any suitable material, for example, block concrete, poured concrete, wood, plastic, or other synthetic materials. The foregoing description is intended to explain the various features and advantages but is not intended to be limiting. From the foregoing, one skilled in the art will appreciate that the same methods may be used when installing doors and other devices on rough openings in walls. The methods of the present invention are likewise applicable to residential, commercial, and other buildings. The scope of the invention is defined by the following claims which are also intended to cover a reasonable range of equivalents.

What is claimed is:

1. A method for installing a window in a building comprising:

a) providing an exterior wall having an interior side, an exterior side and a rough opening of a first shape and a first predetermined size, said first shape and first predetermined size defined by a rough opening frame, the exterior side of the exterior wall having a sheathing layer;

b) providing a window having a perimeter of a second predetermined shape and of a second predetermined size defined by a window frame having a plurality of sides, wherein said second predetermined shape and said second predetermined size are selected so that the window substantially fills the rough opening leaving a gap in the range of ½ inch to ¾ inch surrounding the window frame on all sides between the window frame and the rough opening frame, the window having a plurality of planar flanges, a separate one of the plurality of planar flanges extending radially outward from each one of the plurality of sides of the window frame;

c) inserting the window frame into the rough opening with the plurality of flanges abutting the sheathing layer of the wall and attaching the window frame to the exterior wall with a plurality of rust-proof fasteners while maintaining said gap between the window frame and the rough opening frame;

d) installing a bonding tape so that it extends over an exterior surface of each of the plurality of flanges and a portion of the sheathing layer at least one inch wide surrounding the flanges;

e) installing a building wrap over the exterior side of the wall so that the building wrap extends over an exterior surface of the window bonding tape and the flanges; and f) filling the gap with a sprayed extruded closed cell water-resistant foam, wherein said sprayed extruded closed cell water-resistant foam is adapted to assist in supporting the window in the rough opening and prevent air and moisture migration in or out of the building.

2. The method of claim 1 wherein the rust proof fasteners comprise screws.

3. The method of claim 1 wherein the rust proof fasteners comprise nails.

4. The method of claim 1 wherein the building wrap is held in place over the flange and bonding tape using at least one piece of exterior trim.

5. The method of claim 1 wherein the building wrap is held in place over the flange and rubber bonding tape using wrap fasteners, each of said wrap fastener comprising a nail and a plastic washer.

6. The method of claim 1 wherein the sprayed extruded water-resistant foam is an extruded polystyrene foam.

7. The method of claim 1 wherein bonding tape comprises a substrate and an adhesive layer.

8. The method of claim 7 wherein the substrate is made of a material selected from a group consisting of silicone rubber and ethylene propylene diene monomer (EPDM) rubber.

9. The method of claim 1 wherein the building wrap is selected from a group consisting of asphalt-saturated felt, asphalt-saturated kraft paper, a woven polymeric sheet, a non-woven polymeric sheet, and a liquid-applied polymer-asphalt membrane.

* * * * *